Oct. 17, 1950 L. A. MAJNERI 2,526,570
COMPENSATOR FOR INDEPENDENT FLUID PRESSURE SYSTEMS
Filed Nov. 5, 1945 2 Sheets-Sheet 1
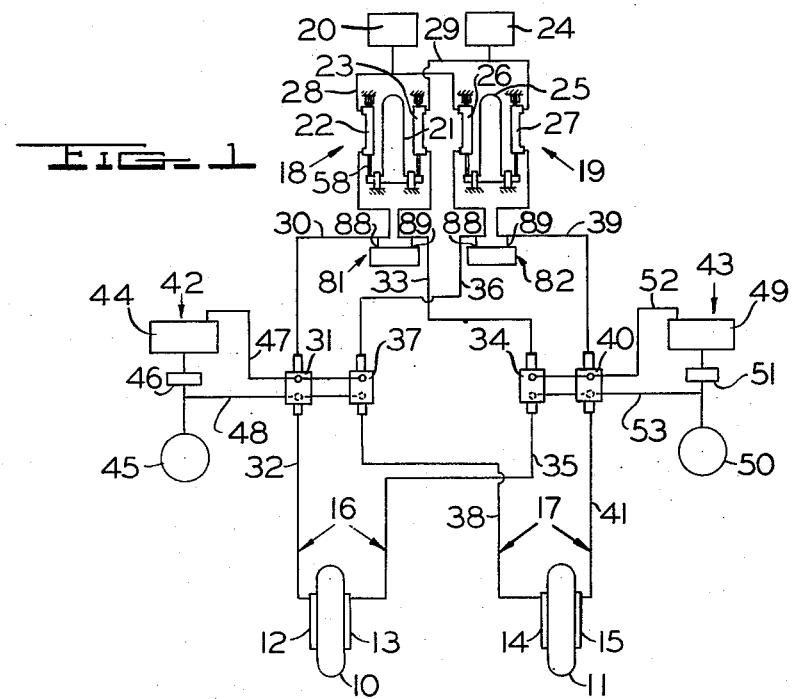
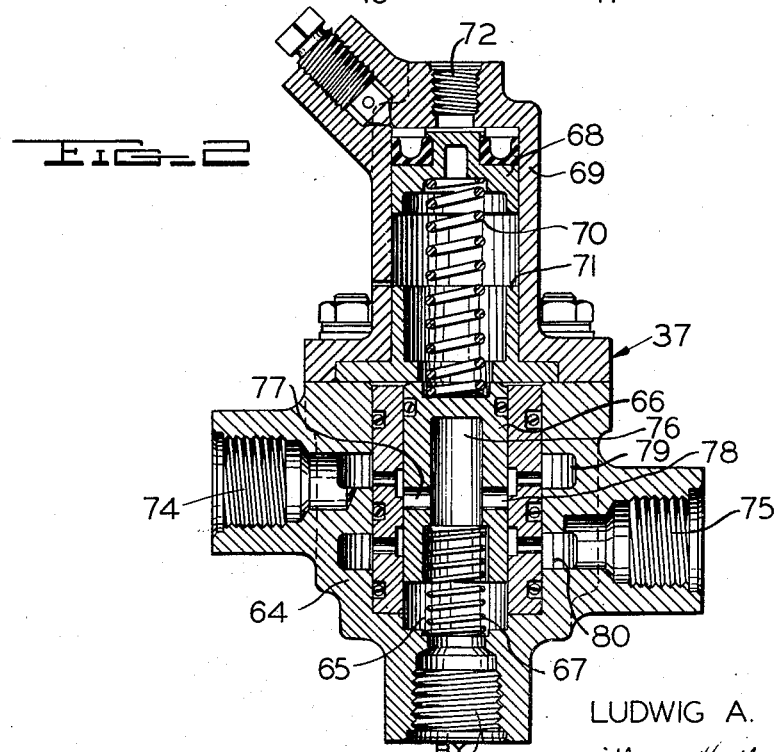
INVENTOR.
LUDWIG A. MAJNERI
ATTORNEYS.

Oct. 17, 1950     L. A. MAJNERI     2,526,570
COMPENSATOR FOR INDEPENDENT FLUID PRESSURE SYSTEMS
Filed Nov. 5, 1945     2 Sheets-Sheet 2
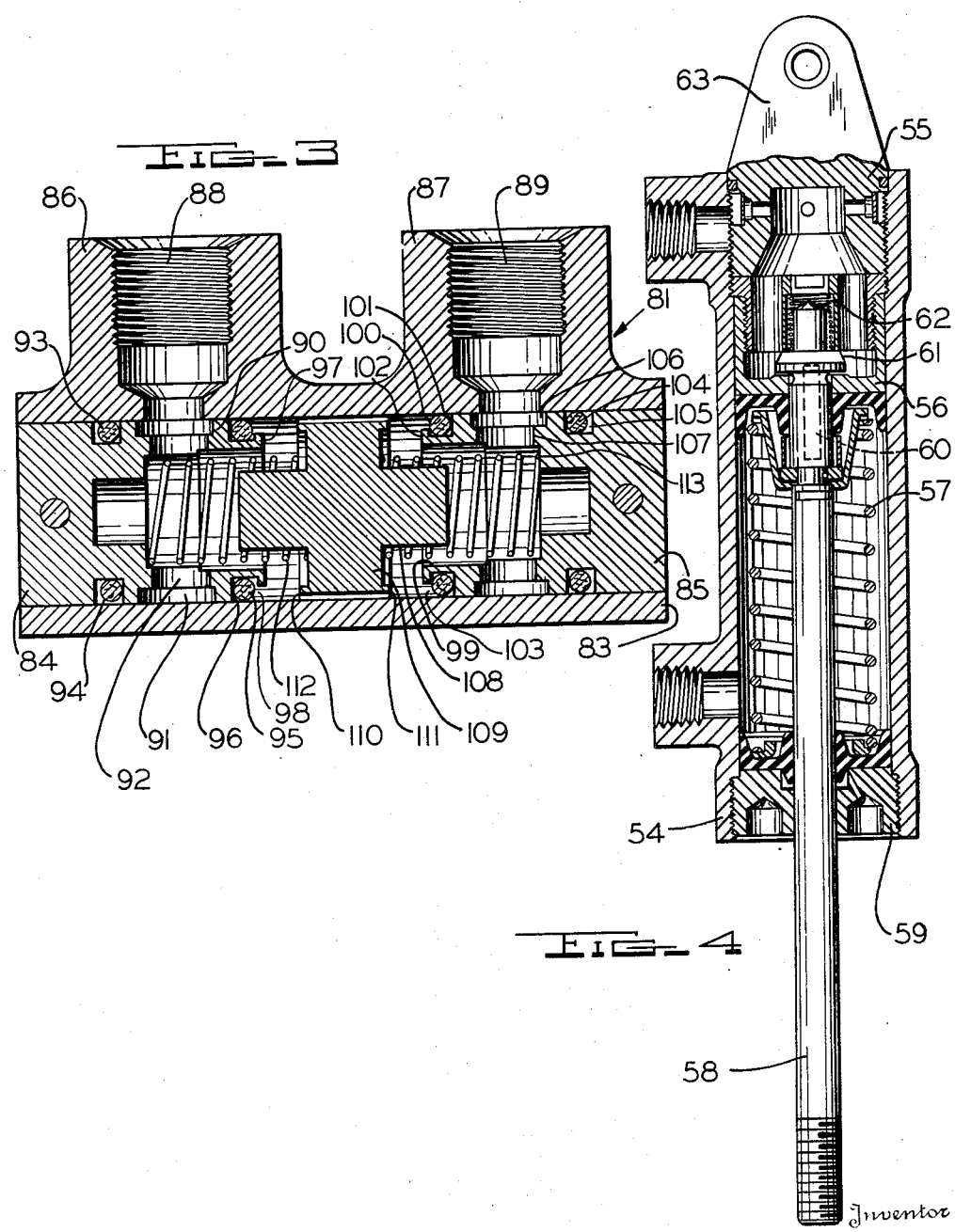
Inventor
LUDWIG A. MAJNERI Patented Oct. 17, 1950

2,526,570

UNITED STATES PATENT OFFICE 2,526,570

COMPENSATOR FOR INDEPENDENT FLUID PRESSURE SYSTEMS

Ludwig A. Majneri, Grosse Pointe, Mich., assignor to The Warner Aircraft Corporation, Detroit, Mich., a corporation of Michigan Application November 5, 1945, Serial No. 626,722

4 Claims. (Cl. 60—54.5)

This invention relates generally to fluid pressure applying mechanism and refers more particularly to improvements in hydraulic applying mechanism for ground engaging wheel brakes.

In certain types of equipment such, for example, as in aircraft, it is desirable to provide a set of independently operable braking systems for the ground engaging wheels at opposite sides of the aircraft and to supplement these systems with a set of emergency braking systems. Under normal conditions, the two sets of braking systems operate in conjunction with one another to produce a one hundred per cent braking effect, but in the event one of the sets of braking systems becomes defective for some reason, the other set will function to provide at least a fifty per cent braking effect on each ground engaging wheel.

The present invention concerns itself more particularly with braking equipment of the above general type and has as one of its objects to provide a compensator for the systems in each set constructed to supply the same applying pressure to the actuators for the brakes in the systems, regardless of variations in displacement of the systems in any one set. Such variations may be caused by leaving a slight amount of air in one system during filling and bleeding the systems, or may result from exerting a greater amount of force on the master cylinder in one system than is exerted on the master cylinder in the other system of the same set during manipulation of the control pedal.

Notwithstanding the cause of the variation, the present invention has as another of its objects to provide a compensator for automatically increasing or decreasing the displacement of one or the other systems in the same set to compensate for any variation in the displacement that may exist in the systems.

Another object of this invention is to provide a compensator which operates automatically in response to failure of one system to isolate the latter and prevent the escape of fluid from the other system served thereby.

A further object of this invention is to provide a compensator embodying a shuttle between the systems of one set which enables restricted leakage of fluid from one system to the other when the shuttle is in its normal operating position. No leakage, of course, occurs when the pressure in the systems served by the compensator are balanced, but if for some reason the pressure in one system exceeds the pressure in the other, fluid escapes past the shuttle until the pressures are equalized and the shuttle assumes an intermediate position in the compensator.

Still another object of this invention is to provide a compensator so constructed and located that in the event one system should fail, the hydrostatic pressure in the reservoir of the other system moves the shuttle in the compensator to one extreme position wherein the defective system is isolated from the remaining operative system.

A still further feature of this invention is to provide a compensator of the above general type wherein displacement of the shuttle to isolate one system served by the compensator from the other takes place during the off position of the brakes, so that the effective travel of the control unit or master cylinder in the operative system during subsequent brake applications is not greater than its normal travel when both systems are effective.

The foregoing as well as other objects will be made more apparent as this description proceeds, especially when considered in connection with the accompanying drawings, wherein:

Figure 1 is a diagram of a typical fluid pressure applying mechanism embodying my invention;

Figure 2 is a sectional view through one of the power valves shown in Figure 1;

Figure 3 is a sectional view through one of the compensators shown in Figure 1; and Figure 4 is a longitudinal sectional view through a typical control unit or master cylinder capable of being used in connection with this invention.

Figure 1 of the drawings diagrammatically illustrates a hydraulic pressure applying mechanism for use in connection with aircraft having right and left hand ground engaging wheels. In detail, the reference numeral 10 indicates the left hand wheel and the numeral 11 designates the right hand wheel. A pair of friction type hydraulically actuated brakes 12 and 13 are provided on the left hand wheel 10 and a similar pair of brakes 14 and 15 are associated with the right hand wheel 11. The left hand wheel brakes are operated by a set of hydraulic braking systems 16 and the right hand wheel brakes are operated by a set of hydraulic braking systems 17. Each set comprises a pair of braking systems which are complete in themselves and operate independently of one another to actuate the brake associated therewith.

The two braking systems in the set 16 are controlled by an assembly 18 and the two braking systems in the set 17 are controlled by an assembly 19. The assembly 18 comprises a brake pedal 21 and a pair of control units or master cylinders 22 and 23 respectively positioned at opposite sides of the brake pedal 21. The control assembly 19 comprises a brake pedal 25 and a pair of control units or master cylinders 26 and 27, respectively supported at opposite sides of the brake pedal 25. The master cylinders of both assemblies share the reservoirs 20 and 24, which are adapted to contain a supply of hydraulic fluid medium.

The upper end of the master cylinder 22 has a fluid connection 28 with the reservoir 20 and with the upper end of the master cylinder 26 in the assembly 19. The upper end of the master cylinder 23 in the assembly 18 has a fluid connection 29 with the reservoir 24 and with the upper end of the master cylinder 27 in the assembly 19. The lower end of the master cylinder 22 in the assembly 18 has a fluid connection 30 with a power valve 31, and the latter has a fluid connection 32 with the brake 12. The lower end of the master cylinder 23 has a fluid connection 33 with a power valve 34 and the latter has a fluid connection 35 with the brake 13. The lower end of the master cylinder 26 has a fluid connection 36 with a power valve 37 and the latter has a fluid connection 38 with the brake 14 on the ground engaging wheel 11. The lower end of the master cylinder 27 has a fluid connection 39 with a power valve 40 and the latter has a fluid connection 41 with the brake 15 on the ground engaging wheel 11.

In accordance with conventional practice, the master cylinders respectively operate the power valves to connect the brakes to power supply systems. In the present instance, two supply systems 42 and 43 are provided. In general, the power supply system 42 serves the brakes 12 and 14, while the power supply system 43 serves the brakes 13 and 15. As shown in Figure 1 of the drawings, the power supply system 42 comprises a reservoir 44 adapted to contain a supply of hydraulic fluid medium, an accumulator 45, and a pump 46. The intake side of the pump 46 is connected to the reservoir and the exhaust side of the pump 46 is connected to the accumulator for maintaining a supply of fluid under pressure in the accumulator. The power valves 31 and 37 have a fluid connection 47 with the top of the reservoir 44 and also have a fluid connection 48 with the pressure side of the accumulator 45.

The power supply system 43 is similar to the system 42 in that it comprises a reservoir 49, an accumulator 50 and a pump 51. The intake side of the pump is connected to the bottom of the reservoir and the exhaust side of the pump is connected to the accumulator 50. The power valves 34 and 40 are connected to the top of the reservoir 49 by a fluid connection 52, and are connected to the pressure side of the accumulator by a fluid connection 53.

The master cylinders in the control assemblies 18 and 19 may be of any suitable design and are preferably identical in construction. One master cylinder is shown in section in Figure 4 of the drawings and comprises a cylinder 54 having the upper end closed by a suitable plug 55. A piston 56 is slidably mounted in the cylinder and is normally urged upwardly in the cylinder by a spring 57. The piston is connected to one of the brake operating pedals by means of a rod 58, which extends downwardly through the lower end of the cylinder and is adapted to be connected to one of the brake operating pedals. The lower end of the cylinder is closed by a plug 59, and the latter also forms a seat for the lower end of the spring 57. The upper end of the rod 58 has a limited sliding connection with the piston 56, and is provided with a passage 60 having the opposite ends respectively communicating with the cylinder at opposite ends of the piston. Communication through the passage 60 is normally controlled by a valve head 61 formed on the rod 58 above the piston 56 and urged against its seat by a coil spring 62. As stated above, the upper end of the cylinder above the piston 56 has a fluid connection with one of the reservoirs and the lower end of the cylinder below the piston has a fluid connection with one of the power valves. Attention is also called to the fact that the upper end of the cylinder is pivotally connected to a suitable support by a fitting 63 formed on the plug 55, so that operation of the brake pedal connected to the lower end of the rod 58 effects a downward movement of the piston 56 in the cylinder 54. It will, of course, be understood that the cylinder 54 is filled with a hydraulic fluid medium with the result that downward movement of the piston 56 in the cylinder displaces this fluid medium and applies a pressure on the power valve connected to the lower end of the cylinder. On the other hand, when the operating force exerted on the rod 58 is released, the spring 57 moves the piston 56 to its upper position shown in Figure 4 and the valve 61 is opened to enable transfer of fluid between the cylinder and associated reservoir.

Each of the four power valves shown in Figure 1 of the drawings are identical in construction and are preferably of the design shown in Figure 2 of the drawings. In this latter figure of the drawings, the power valve 37 is featured and a description of this valve will suffice for the other power valves in the systems. This power valve comprises a casing 64 having a cylindrical valve chamber 65 and having a piston 66 supported in the chamber 65 for vertical sliding movement. The piston 66 is normally urged to its uppermost position shown in Figure 2 of the drawings by a coil spring 67 acting on the lower end of the piston and is operated by fluid pressure through a plunger 68, which is slidably supported in an extension 69 of the valve casing 64. A coil spring 70 is interposed between the plunger 68 and piston 66. The coil spring 70 acts as a yieldable connection between the plunger 68 and the piston 66 for actuating the latter from the former. A positive stop 71 is positioned in the extension 69 for engaging the plunger 68 in the event the applying pressure exerted on the plunger 68 becomes excessive.

The upper end of the extension 69 beyond the plunger 68 is provided with a port 72 which, in the present instance, is connected to the lower end of the master cylinder 26. A second port 73 is formed in the lower end of the casing 64 and this port is connected to the brake 14. A third port 74 is positioned in one side of the casing 64 and is connected to the top of the reservoir 42. A fourth port 75 is formed in the opposite side of the casing 64 and is connected to the high pressure side of the accumulator 45.

The piston 66 is formed with a chamber 76 having diametrically opposed ports 77 and 78. Movement of the piston 66 in opposite directions in the valve chamber 65 alternatively registers the ports 77 and 78 with annular recesses 79 and 80 formed in the valve casing 64. The annular recess 79 communicates with the port 74 and the annular recess 80 communicates with the port 75.

When the various parts of the power valve are in the relative positions shown in Figure 2 of the drawings, the ports 77 and 78 communicate with the annular recess 79, which in turn, communicates with the reservoir 44 through the port 74. Inasmuch as the lower end of the chamber 76 in the valve piston constantly communicates with the port 73, it follows that the brake 14 is connected to the reservoir 44 in the above described position of the valve piston 66. On the other hand, when the master cylinder 26 is operated to displace hydraulic fluid in the line 36, the plunger 68 moves the piston 66 downwardly through the spring 70 and registers the ports 77 and 78 with the annular recess 80. During this downward movement of the piston 66, the reservoir port 74 is, of course, closed and fluid under pressure from the accumulator 45 is admitted through the line 38 to the brake 14. In the event the pressure at the brake 14 becomes excessive, the valve piston 66 is moved upwardly against the applying pressure to again register the ports 77 and 78 with the annular recess 79 to thereby relieve the brake applying pressure to the reservoir 44. When sufficient pressure has been relieved, the valve piston 66 again moves downwardly to close the reservoir port 74 and to again open the accumulator port 75 in the event additional pressure is required. In other words, the construction is such that the piston 66 floats back and forth in the valve chamber 65 to maintain the desired applying pressure at the brake 14.

Inasmuch as all of the power valves in the mechanism shown in Figure 1 of the drawings are identical in construction, it follows that operation of both brake pedals applies the brakes associated with both ground engaging wheels. The brake 12 is applied by the power valve 31 through the supply system 42 and the brake 13 is applied by the power valve 34 through the other supply system 43. The brake 14, on the other hand, is operated by the power valve 37 through the supply system 42 and the brake 15 is operated by the power valve 40 through the supply system 43. The arrangement is such that should a failure occur in one of the power supply systems or in one of the brake control assemblies, the other power supply system and its associated controlling assembly are still available and are capable of producing at least half of the required braking effort on the ground engaging wheels 10 and 11.

Difficulty has been encountered in hydraulic applying mechanisms of the type previously described in supplying uniform hydraulic pressures to the several brakes during normal operation. This difficulty usually arises from variations in displacement between the braking systems in either or both of the sets 16 and 17. Such variations may be caused by leaving a slight amount of air in one system during filling and bleeding the systems, or may result from exerting a greater amount of force on the master cylinder in one system than is exerted on the master cylinder in the other system of the same set during manipulation of the control pedal.

The present invention provides for supplying uniform applying pressures at the various brakes regardless of variations in displacement that may exist in the braking systems serving the brakes. This is accomplished in the present instance by providing two equalizers indicated in Figure 1 of the drawings by the reference characters 81 and 82. The two equalizers are identical in construction and a detailed description of one of the equalizers will serve for both. In Figure 3 of the drawings, the equalizer 81 is shown in section and comprises a casing 83 having the opposite ends respectively closed by plugs 84 and 85. A pair of bosses 86 and 87 extend upwardly from the casing 83 in spaced relation to each other longitudinally of the casing. The bosses are respectively formed with ports 88 and 89, which communicate with the interior of the casing 83. By extending the bosses in an upward direction and by providing the latter with relatively large ports, it is possible to prevent trapping air in the compensator during the filling and bleeding operations, so that special bleeding means need not be provided.

The plug 84 is secured in the end of the casing adjacent the boss 86 and is provided with a tubular portion 90, which extends inwardly beyond the port 88. The periphery of the plug 84 is formed with an annular groove 91 in registration with the port 88 and the groove communicates with the interior of the casing through radially extending ports 92. An O-ring seal 93 is supported in a groove 94 in the plug 84 at the outer side of the port 88 to prevent leakage of fluid from the casing around the plug 84. A second O-ring seal 95 is supported in a groove 96 formed in the sleeve 90 at the inner side of the port 88 and the inner wall 97 of the groove 96 is cut away at the periphery of the sleeve 90 to form an annular entrant opening 98. The plug 85 at the end of the casing 83 adjacent the boss 87 is identical in construction to the plug 84 and comprises a sleeve 99 which extends inwardly beyond the port 89. An O-ring seal 100 is located in an annular groove 101 formed in the periphery of the sleeve 99 at the inner side of the port 89 and the inner wall 102 of the groove is cut away to form an annular entrant opening 103. A second O-ring seal 104 is supported in an annular groove 105 formed in the periphery of the plug 85 at the outer side of the port 89 to prevent the escape of fluid from the casing 83 past the plug 85. An annular groove 106 is formed in the periphery of the plug 85 in registration with the port 89 and this groove communicates with the interior of the casing through radially extending ports 107.

Slidably supported in the casing 83 is a valve member or shuttle 108 having an enlarged intermediate portion 109 slidably engaging the inner wall of the casing 83 between the seals 95 and 100. The periphery of the enlarged portion 109 is formed with oppositely extending annular flanges 110 and 111. These flanges are alternatively adapted to engage the O-ring seals 95 and 100 upon movement of the shuttle 108 in opposite directions in the casing 83. The shuttle is normally urged to the intermediate position shown in Figure 3 of the drawings by a pair of coil springs 112 and 113 respectively positioned at opposite sides of the enlarged portion 109 on the shuttle. The inner ends of the coil springs respectively abut opposite sides of the enlarged portion 109 and the opposite ends of the springs respectively abut shoulders formed on the plugs 84 and 85.

Upon reference to Figure 1 of the drawings, it will be noted that the port 88 has a fluid connection with the upper end of the power valve 31 and is also connected to the lower end of the master cylinder 22. The port 89 has a fluid connection with the upper end of the power valve 34 and is also connected to the lower end of the master cylinder 23. Thus, the compensator 81 connects the hydraulic braking systems serving the left hand brakes 12 and 13. This compensator is also located between the control assembly 18 and the power valves for the brakes 12 and 13.

The port 88 of the compensator 82 is connected to the upper end of the power valve 37 and is also connected to the lower end of the master cylinder 26. The port 89 of the compensator 82 is connected to the upper end of the power valve 40 and is also connected to the lower end of the master cylinder 27. Thus, the compensator 82 connects the hydraulic braking systems serving the brakes 14 and 15. The compensator 82 is also located between the control assembly 19 and the power valves for the brakes 14 and 15.

When the two sets of braking systems are operated in a normal manner, the shuttle valves in the compensator are located in their intermediate positions shown in Figure 3 of the drawings. However, if for any reason, the line pressure in the two systems connected to any one compensator should vary, the shuttle in this compensator will shift to increase the displacement in the system having the higher pressure and to correspondingly decrease the displacement in the system having the lower pressure. The extent of movement of the shuttle, of course, depends upon the pressure differential and is sufficient to equalize the pressures. Attention is now directed to the fact that the compensators are installed at a substantially lower elevation than the reservoirs in the control assemblies and the springs acting on the shuttle 108 are of such strength that the shuttle is moved to one or the other of its extreme positions by the hydrostatic pressure in the line between one reservoir and the compensators in the event the other reservoir should become dry. For example, assuming that the hydraulic fluid medium in the reservoir 24 escapes for some reason or another, the hydrostatic pressure in the line between the reservoir 20 and the compensators acts on the shuttle valves 108 to move the latter against the seals 100. As a result, the braking systems serving the brakes 13 and 15 are isolated and approximately one-half of the normal braking effort is available at both ground engaging wheels. Of course, if the reservoir 20 should become dry, the shuttles 108 are moved in the opposite direction against the seals 95 to isolate the braking systems serving the brakes 12 and 14. It may be pointed out at this time that in installations where it is not practical to support the reservoirs at such elevations relative to the compensators to provide the necessary hydrostatic pressure, any one of the various accepted designs of spring loaded reservoirs may be employed.

Assuming that the shuttles have been moved to isolate one braking system of each set, it will be noted that subsequent operation of the control pedals operates the master cylinders in the usual manner. However, only one master cylinder of each set is effective, because the other master cylinders are connected to defective systems. Notwithstanding this condition, the extent of travel of the effective master cylinders to obtain brake application is no greater than when all of the braking systems are operating in the normal manner.

Attention is further called to the fact that a very slight clearance exists between the enlarged portions of the shuttles 109 and the inner surfaces of the casings 83, so that a limited amount of fluid may escape past the shuttles when the latter are in any one of their intermediate positions with respect to the seals 95 and 100. With this construction, it will be noted that when the brakes are held in their applied positions, and a differential in pressure exists between the systems served by the compensators, a slight seepage of fluid takes place around the shuttles until the pressures in the systems become neutralized, whereupon the shuttles are gradually returned to their central positions shown in Figure 3 of the drawings.

What I claim as my invention is:

1. Fluid pressure operating mechanism comprising a pair of master cylinders having pistons therein and containing a fluid, means for relatively moving said pistons and cylinders to displace fluid in the cylinders, a chamber having spaced ports respectively communicating with the master cylinders, a shuttle slidable in the chamber between said ports and dividing said chamber into two spaces, said spaces respectively communicating with the ports aforesaid and having restricted communication with each other, means providing fluid connections between the spaces and instrumentalities to be operated by the master cylinders, a pair of seals respectively positioned in the chamber between opposite ends of the shuttle and spaces for engagement with the shuttle upon movement of the latter to its extreme position in either direction of movement and thereby seal one space from the other, and yieldable means for positioning the shuttle intermediate the seals and out of engagement with the latter.

2. Fluid pressure operating mechanism comprising a pair of master cylinders having pistons therein, power valves respectively connected to the master cylinders, means for relatively moving the pistons and cylinders to operate the power valves, a chamber positioned between the master cylinders and power valves, a shuttle slidable in the chamber and dividing the latter into two spaces having restricted communication with each other, ports in said chamber respectively communicating with said spaces, fluid connections between the master cylinders and said spaces and between the latter and power valves, sealing means in said chamber at opposite ends of the shuttle and alternately cooperating with said shuttle upon movement of the latter in opposite directions to seal the ports from communication with one another, and yieldable means acting on opposite ends of the shuttle tending to maintain the latter in a neutral position out of engagement with said seals.

3. Fluid pressure operating mechanism comprising a pair of independent fluid systems, each having a reservoir for fluid medium, a chamber supported at a lower elevation than the reservoirs, a shuttle slidable in the chamber and forming end spaces, means affording communication between the end spaces and the reservoirs, seals in the chamber at opposite ends of the shuttle and coacting with the shuttle upon movement thereof to extreme positions in opposite directions to alternatively seal the chamber from the reservoirs, opposed spring means acting on opposite ends of the shuttle for urging the latter to a central position in the chamber, means providing for the escape around the shuttle in the central position thereof and the force applied by the spring means being predetermined to enable movement of the shuttle into engagement with one of the seals in response to a substantial drop in pressure in one of the reservoirs and by the hydrostatic pressure of the fluid in the other reservoir and in the connection between the latter and chamber.

4. Fluid pressure operating mechanism comprising two independent systems, each including a reservoir containing fluid, a chamber having spaced ports, a pair of pressure producing devices respectively connecting said ports to the reservoirs, a seal supported in the chamber at the inner side of each port, a shuttle having a portion slidable in the chamber between the seals to inversely change the volume of the systems in response to an unbalanced fluid pressure in the systems, yieldable means acting on opposite ends of the shuttle and operable to urge the shuttle to a neutral position out of contact with said seals, means providing for the escape of fluid around the shuttle in the neutral position thereof, and means at opposite ends of the shuttle engageable with one or the other of said seals in response to an abnormal drop in fluid pressure in one or the other of said systems.

LUDWIG A. MAJNERI.

REFERENCES CITED

The following references are of record in the file of this patent:

UNITED STATES PATENTS

| Number    | Name        | Date           |
|-----------|-------------|----------------|
| 1,568,159 | Haywood     | Jan. 5, 1926   |
| 1,588,657 | Christensen | June 15, 1926  |
| 1,707,781 | Blanchard   | Apr. 2, 1929   |
| 1,955,180 | Furgason    | Apr. 17, 1934  |
| 2,055,182 | Schultz     | Sept. 22, 1936 |
| 2,080,687 | Bowen       | May 18, 1937   |
| 2,160,074 | La Brie     | May 30, 1939   |
| 2,265,117 | Seymour     | Dec. 2, 1941   |
| 2,336,891 | Schnell     | Dec. 14, 1943  |

FOREIGN PATENTS

| Number  | Country       | Date          |
|---------|---------------|---------------|
| 757,593 | France        | Oct. 16, 1933 |
| 409,169 | Great Britain | Apr. 26, 1934 |